United States Patent Office.

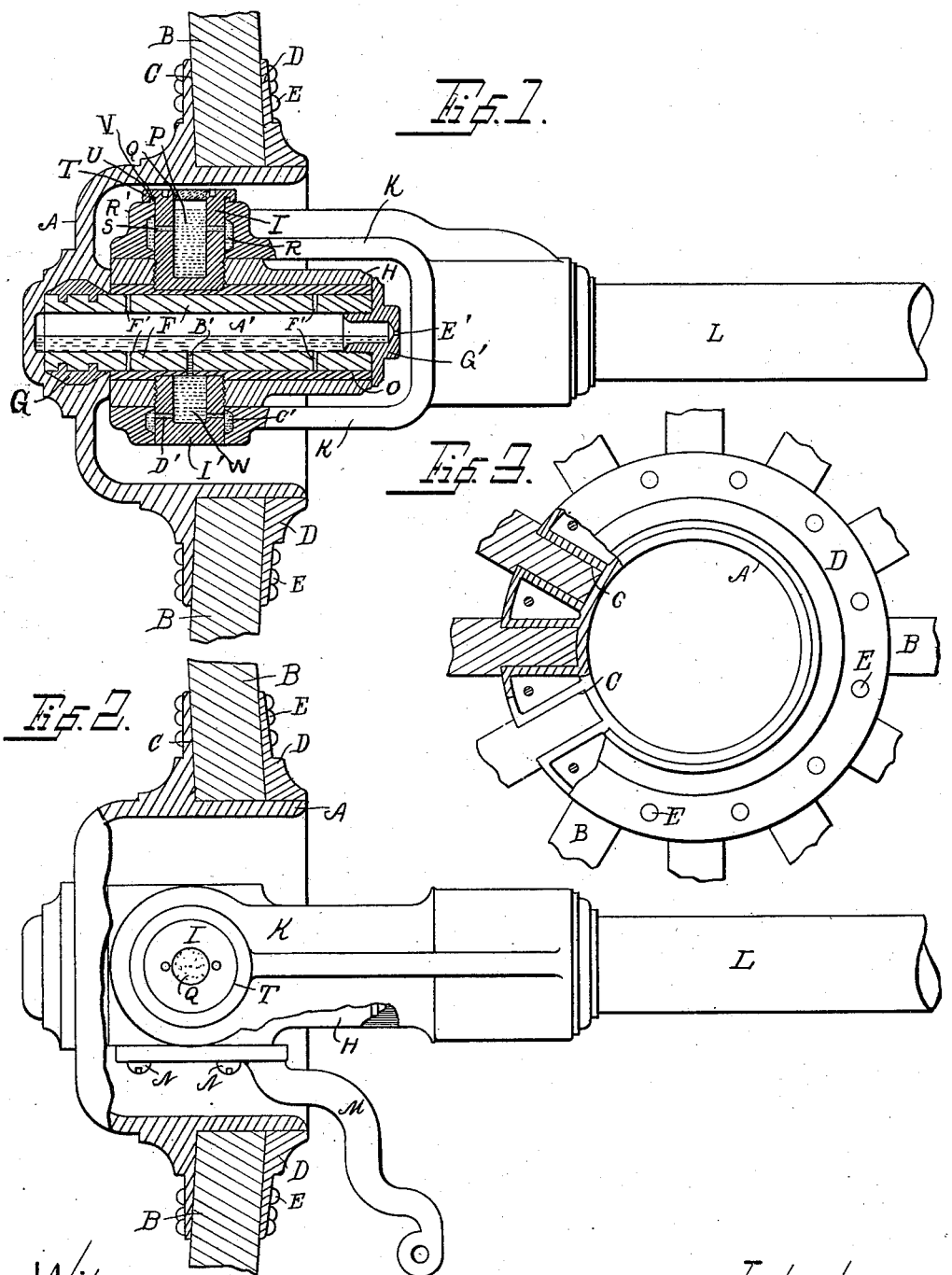

JOSEPH SHAVER, OF MILWAUKEE, WISCONSIN.

VEHICLE-HUB.

SPECIFICATION forming part of Letters Patent No. 661,590, dated November 13, 1900.

Application filed July 9, 1900. Serial No. 22,946. (No model.)

*To all whom it may concern:*

Be it known that I, JOSEPH SHAVER, a citizen of the United States, residing at Milwaukee, county of Milwaukee, and State of Wisconsin, have invented new and useful Improvements in Vehicle-Hubs, of which the following is a specification.

My invention relates to improvements in steering mechanism for mechanically-propelled vehicles; and it pertains to that class in which the steering or guiding wheels are separately pivoted, so that the vehicle may be guided without turning or changing the relative position of the axle of such wheels to the body of the vehicle.

My invention pertains more especially to the construction and arrangement of the vehicle-trunnions by which the wheel, journal-bearings, and hub are pivotally connected with the axle of the vehicle; and the objects of my improvements are to simplify the construction, exclude dust from the journal-bearings, and provide means for automatic lubrication of the contiguous moving surfaces.

My invention is further explained by reference to the accompanying drawings, in which—

Figure 1 is a central vertical section. Fig. 2 is a top view, part in section; and Fig. 3 represents the inner or right-hand side of the wheel-hub, part in section, with the axle and journal-bearings removed.

Like parts are identified by the same reference-letters throughout the several views.

A is a hollow hub to which the spokes B are secured in recesses C by the annular plate D and rivets E, as indicated.

F is a horizontal hollow trunnion which is rigidly affixed to the hub A either by an ordinary screw-threaded joint or by a Babbitt-metal joint G, as shown in Fig. 1.

H is a metal sleeve within which the trunnion F rotates, said sleeve and trunnion together forming the axial or journaled bearings of the wheel.

I and I' are hollow vertical trunnions which are respectively secured at their inner ends to the sleeve H, one above and one below the trunnion F. The two outer ends of the trunnions I and I' have pivotal bearings in the bifurcated arms K K of the axle, whereby the wheel, together with the hub A, trunnion F, and sleeve H, is free to turn toward the right or left on said vertical trunnions I I', as may be required to guide the vehicle, while the axle L remains at rest. The required motion for guiding the vehicle is communicated to the two steering-wheels (one only of which is shown) by the steering-arm M, which arm is secured to the side of the sleeve H by screws or bolts N.

O is a brass or Babbitt-metal antifriction-bearing which is preferably, but not necessarily, interposed between the trunnion F and sleeve H. The upper trunnion I is provided with an oil-chamber P and a cover Q, which cover is removed when supplying the chamber with oil.

R is an annular groove formed in the trunnion-bearing R', which communicates with the oil-chamber P through the duct S, whereby it is obvious that the contiguous bearings of the trunnion I are kept lubricated from the chamber P.

The upper end of the trunnion I is provided with an annular flange T, in which a groove U is formed for the reception of the annular shoulder V, the office of which shoulder and groove is to prevent dust or sand from entering the bearings of said trunnions.

The lower trunnion I' is provided with an oil-chamber W, which is filled with oil from the chamber A' through the oil-duct B'. C' is an annular oil-chamber, which is filled with oil from the chamber W through the duct D'. The oil-chamber A' is filled with oil from an ordinary oil-can through the duct E', formed in the sleeve-retaining nut or cap G'. The oil-ducts F' F' are formed through the wall of the trunnion F, by which oil from the chamber A' is led to the contiguous surfaces of said trunnion and the inclosing sleeve. It will be obvious that when the oil-chambers A' and P have been supplied with oil the same will be automatically fed by gravity to all the contiguous wearing-surfaces of the trunnions and sleeves, whereby such parts will be automatically lubricated for a long period of time without further attention.

It will be understood that the steering-arms of the two guiding-wheels, one of which is not shown, are adapted to be connected with a single guiding-arm in the ordinary manner, by which both guiding-wheels are simultaneously turned and the vehicle is guided.

Having thus described my invention, what I claim as new, and desire to secure by Letters Patent, is—

1. In separately-pivoted steering-wheels for mechanically-propelled vehicles, the combination of a hollow hub; an inwardly-projecting hollow horizontal trunnion rigidly affixed at one end to said hollow hub; a sleeve within which said trunnion rotates; a sleeve-retaining nut or cap having screw-threaded bearings in the inner wall of said hollow trunnion; two vertical hollow trunnions rigidly affixed at their opposing ends to the walls of said sleeve; a vehicle-axle; bifurcated arms connected with such vehicle-axle, provided with journaled bearings, one above and one below said horizontal trunnion, within said hollow hub, for the reception of said vertical trunnion; and oil ducts or passages communicating from oil-spaces in said trunnions with the bearing-surfaces of said trunnion, substantially as and for the purpose specified.

2. In separately-pivoted steering-wheels for mechanically-propelled vehicles, the combination of a hollow hub; an inwardly-projecting hollow horizontal trunnion rigidly affixed at one end of said hollow hub; a sleeve within which said trunnion rotates; a sleeve-retaining nut or cap having screw-threaded bearings in the inner wall of such hollow trunnion; an oil-aperture formed through said nut or cap for the introduction of oil; two vertical hollow trunnions rigidly affixed at their opposing ends, to the walls of said sleeve, said upper vertical trunnion being provided with an annular flange in which an annular groove is formed for the reception of a corresponding shoulder of the trunnion-bearings; a vehicle-axle; bifurcated arms affixed to said axle, provided with bearings, one above and one below said horizontal trunnion, within said hollow hub, for the reception of said vertical trunnions, and oil ducts or passages communicating from oil-spaces in said trunnions with the bearing-surfaces of said trunnions, substantially as and for the purpose specified.

3. In separately-pivoted steering-wheels for mechanically-propelled vehicles, the combination of a hollow hub; an inwardly-projecting hollow horizontal trunnion rigidly affixed at one end to said hollow hub; a sleeve within which said trunnion rotates; a sleeve-retaining nut or cap having screw-threaded bearings in the inner wall of said hollow trunnion; two vertical hollow trunnions rigidly affixed at their opposing ends to the walls of said sleeve; a vehicle-axle; bifurcated arms provided with journal-bearings, one above and one below said horizontal trunnion, within said hollow hub, for the reception of said vertical trunnions; oil-ducts communicating from the hollow spaces in the said upper vertical trunnion, with its journaled bearings; and an oil-duct communicating from the oil-space in said horizontal trunnion to the hollow space in said lower vertical trunnion; and oil-ducts communicating from the spaces in said lower vertical trunnion, with its journaled bearings, substantially as and for the purpose specified.

In testimony whereof I affix my signature in the presence of two witnesses.

JOSEPH SHAVER.

Witnesses:
JAS. B. ERWIN,
C. L. ROESCH.